(12) United States Patent
Park et al.

(10) Patent No.: US 9,183,249 B2
(45) Date of Patent: Nov. 10, 2015

(54) APPARATUS AND METHOD FOR GENERATING A PATH

(75) Inventors: Cheol-Woo Park, Seoul (KR); Soon-Sung Kwon, Anyang (KR); Hyun Mi Kim, Uiwang (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/617,165

(22) Filed: Sep. 14, 2012

(65) Prior Publication Data

US 2013/0132426 A1    May 23, 2013

Related U.S. Application Data

(63) Continuation-in-part of application No. 13/320,649, filed as application No. PCT/KR2010/003055 on May 14, 2010, now abandoned.

(60) Provisional application No. 61/591,221, filed on Jan. 26, 2012.

(30) Foreign Application Priority Data

May 15, 2009    (KR) .......................... 10-2009-0042401

(51) Int. Cl.
*G06F 17/00*    (2006.01)
*G06F 17/30*    (2006.01)

(52) U.S. Cl.
CPC .... *G06F 17/30424* (2013.01); *G06F 17/30398* (2013.01)

(58) Field of Classification Search
CPC ................ G06F 17/30442; G06F 17/30536; G06F 21/6218; G06F 17/30; G06F 17/30545; G06F 17/30864; G06F 17/30908
USPC .................................................. 707/724, 716
See application file for complete search history.

(56) References Cited

U.S. PATENT DOCUMENTS 6,505,186 B1    1/2003    Muro et al.
8,290,613 B2    10/2012    Shani
(Continued)

FOREIGN PATENT DOCUMENTS

EP    1 669 719 A1    6/2006
JP    H11-312233 A    11/1999
(Continued)

OTHER PUBLICATIONS

European Search Report, mailed May 15, 2015 in corresponding European Patent Application No. 13151681.7.

*Primary Examiner* — Truong Vo
(74) *Attorney, Agent, or Firm* — Mintz Levin Cohn Ferris Glovsky and Popeo, P.C.; Peter F. Corless; Jonathon P. Western

(57) ABSTRACT

One aspect of the invention provides a method for generating a path. The method includes: storing, in a storing unit, at least one path for each arbitrarily set section; setting, in a path setting unit, a main path from an origination to a destination input from a user and then displaying the main path through a display unit; searching, in a path generating unit, for at least one recommended path for one or more sections corresponding to a theme selected from the user and then displaying a searched recommended path through the display unit; receiving, in an input unit, a selection of one or more recommended paths; and generating, in the path generating unit, a final path based on the selection of one or more recommended paths for the one or more sections.

18 Claims, 8 Drawing Sheets

(56) References Cited

U.S. PATENT DOCUMENTS

| | | |
|---|---|---|
| 8,428,874 B2 | 4/2013 | Park et al. |
| 2002/0133289 A1 | 9/2002 | Miyaki |
| 2003/0061211 A1 | 3/2003 | Shultz et al. |
| 2004/0068433 A1 | 4/2004 | Chatterjee et al. |
| 2006/0064346 A1 | 3/2006 | Steenstra et al. |
| 2006/0069503 A1* | 3/2006 | Suomela et al. ............ 701/211 |
| 2007/0008181 A1 | 1/2007 | Rollert et al. |
| 2007/0083408 A1 | 4/2007 | Altberg et al. |
| 2008/0208690 A1 | 8/2008 | Lim |
| 2008/0288104 A1 | 11/2008 | Shani |
| 2009/0043489 A1* | 2/2009 | Weidner ........................ 701/201 |
| 2009/0287572 A1 | 11/2009 | Whelan |
| 2009/0327078 A1 | 12/2009 | Ohazama et al. |
| 2010/0015994 A1* | 1/2010 | Mcbride et al. ............ 455/456.1 |
| 2011/0093188 A1 | 4/2011 | Barkai et al. |
| 2011/0093458 A1 | 4/2011 | Zheng et al. |
| 2012/0016576 A1 | 1/2012 | Huang et al. |
| 2012/0072448 A1 | 3/2012 | Kwon et al. |
| 2013/0245944 A1 | 9/2013 | Rutten et al. |

FOREIGN PATENT DOCUMENTS

| | | |
|---|---|---|
| JP | 2002-297654 A | 10/2002 |
| JP | 2002-340604 A | 11/2002 |
| JP | 2007-206608 A | 8/2007 |
| JP | 2009-047451 A | 3/2009 |
| JP | 2009-128866 A | 6/2009 |
| JP | 2009-157851 A | 7/2009 |
| KR | 10-0279760 B1 | 11/2000 |
| KR | 10-2001-078857 | 8/2001 |
| KR | 10-2004-0028076 | 4/2004 |
| KR | 10-2005-0000225 | 1/2005 |
| KR | 10-2005-0119924 | 12/2005 |
| KR | 10-2006-020914 | 3/2006 |
| KR | 10-2008-0034272 | 4/2008 |
| KR | 10-0875374 B1 | 12/2008 |
| KR | 2009-0032243 A | 4/2009 |
| KR | 10-2009-0044361 | 5/2009 |
| KR | 2010-0001762 A | 1/2010 |
| KR | 2010-0123264 A | 11/2010 |
| KR | 2011-0020409 A | 3/2011 |

* cited by examiner

APPARATUS AND METHOD FOR GENERATING A PATH

CROSS-REFERENCE TO RELATED APPLICATIONS

This application claims priority under 35 U.S.C. §119(e) to U.S. Provisional Patent Application Ser. No. 61/591,221, filed Jan. 26, 2012. This application is also a continuation-in-part under 35 U.S.C. §120 of U.S. patent application Ser. No. 13/320,649, filed Nov. 15, 2011, which is a national phase application under 35 U.S.C. §371 of International Application No. PCT/KR2010/003055, filed May 14, 2010, which claim priority to Korean Patent Application No. 10-2009-0042401, filed May 15, 2009. The entire content of each of the above-referenced patent applications is hereby incorporated by reference herein.

FIELD OF THE INVENTION

The present invention relates to an apparatus and method for generating a path (e.g., a space of interest path), and more particularly, to a method of providing a theme of use and recommended paths for each section corresponding to the theme of use based on at least one path matched to each arbitrarily set section to allow them to be selected. A space of interest (SOI) refers to a collection of data about a space of people's interest or use. An SOI is made up of point, line and/or plane and has a unique identifying data.

Here, the SOI indicating a path between a start point and an arrival point of an arbitrarily set section ("path SOI"), includes a path SOI that does not include information on a relationship with a content as well as a path SOI that includes the information on a relationship with contents. Here, the content has a form in which a text, an image, a moving picture, and the like, are provided, respectively, or are combined with each other.

BACKGROUND OF THE INVENTION

In general, when a path generating system receives an origination and a destination from a user, it searches for path data stored in a database to extract path data from the origination to the destination. In this case, the path generating system extracts path data according to the shortest path or the shortest time.

SUMMARY OF THE INVENTION

Accordingly, the present invention has been made to solve the above-mentioned problems occurring in the prior art while advantages achieved by the prior art are maintained intact.

An object to be achieved by the present invention is to provide an SOI-based path generating apparatus and method capable of allowing a user to select paths for each section in his/her desired theme by including a database storing at least one path SOI for each arbitrarily set section and providing at least one recommended path for each theme and each section corresponding to each theme.

That is, an object to be achieved by the present invention is to provide an SOI-based path generating apparatus and method capable of allowing a user to select paths for each section in his/her desired theme by setting a main path corresponding to an origination and a destination input from the user and providing at least one recommended path for each section corresponding to a specific theme in the case in which the user selects the specific theme.

One aspect of the invention provides a method for generating a path. The method includes: storing, in a storing unit, at least one path for each arbitrarily set section; setting, in a path setting unit, a main path from an origination to a destination input from a user and then displaying the main path through a display unit; searching, in a path generating unit, for at least one recommended path for one or more sections corresponding to a theme selected from the user and then displaying a searched recommended path through the display unit; receiving, in an input unit, a selection of one or more recommended paths; and generating, in the path generating unit, a final path based on the selection of one or more recommended paths for the one or more sections.

In one embodiment, in the step of generating of the final path, a section of the main path is arbitrarily selected for inclusion in the final path where a recommended path was not selected by the user for the section.

The method can further include displaying, in the display unit, the final path.

In another embodiment, the setting of the main path step, the main path is set based on previously-stored paths.

In another embodiment, in the storing step, paths uploaded by other users are stored.

In another embodiment, the main path is initially set in the setting step as an optimal path from the origination to the destination.

In another embodiment, the optimal path minimizes one or more selected from the group consisting of: distance, travel time, and fuel consumption.

In another embodiment, the at least one recommended path for each section is displayed in the searching step concurrently with the corresponding section from the main path proposed in the setting step. In another embodiment, a degree of deviation from the main path proposed in the setting step to a recommended path for each section is displayed. In another embodiment, the degree of deviation is expressed in terms of one or more selected from the group consisting of: distance, travel time, and fuel consumption. In another embodiment, the recommended path is extended to connect with one or more other sections.

Another aspect of the invention provides an apparatus for generating path. The apparatus includes: a storing unit configured for storing at least one path SOI for each arbitrarily set section; an input unit configured for receiving an origination and a destination input from a user, receiving a theme selected from the user, and receiving a selection of one or more recommended paths for one or more sections corresponding to the selected theme from the user; a path setting unit configured for setting a main path from the origination to the destination input through the input unit; a display unit configured for displaying the main path set by the path setting unit, a theme list, each section corresponding to the selected theme, and at least one recommended path corresponding to each section; and a path generating unit configured for searching for at least one recommended path for each section corresponding to the selected theme from the storing unit to transfer a searched recommended path to the display unit and generating a final path based on the selection of one or more recommended paths for each section corresponding to the theme selected through the input unit, on the main path set by the path setting unit.

In one embodiment, the path generating unit arbitrarily selects a section of the main path for inclusion in the final path where a recommend path was not selected by the user for the section.

In another embodiment, the display unit further performs a function of displaying the final path generated by the path generating unit.

In another embodiment, the path setting unit sets the main path based on paths previously-stored in the storing unit.

In another embodiment, the storing unit stores paths uploaded by other users.

In another embodiment, path setting unit is further configured to initially set the main path as an optimal path from the origination to the destination. In another embodiment, the optimal path minimizes one or more selected from the group consisting of: distance, travel time, and fuel consumption.

In another embodiment, the display unit is further configured to display at least one recommended path for each section concurrently with the corresponding section from the main path proposed in the setting step. In another embodiment, the display unit is further configured to display a degree of deviation from the main path to a recommended path for each section.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

The path generating system according to the related art does not provide a recommended path associated with the path from the origination to the destination received from the user in setting a path using path data based on a node or a link and providing recommended paths for each theme. That is, the path generating system according to the related art provides recommended paths for each theme that can not be associated with a path set according to a user's request.

Even though the path generating system according to the related art provides a recommended path associated with the path to the destination, it has provided a fixed recommended path in which a section can not be changed, such that all users have used a unified recommended path, thereby making it impossible to satisfy users having various tendencies.

Hereinafter, exemplary embodiments of the present invention will be described in detail with reference to the accompanying drawings.

Figure 1:
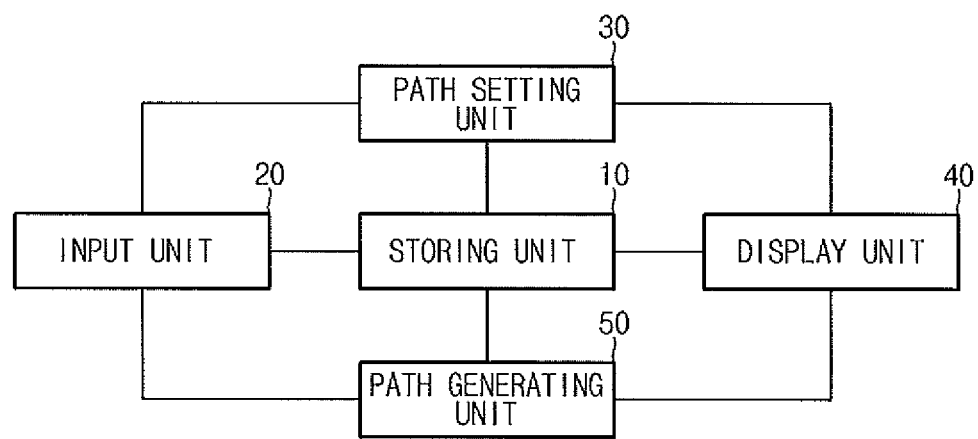
FIG. 1 is a configuration diagram of an SOI-based path generating apparatus according to an exemplary embodiment of the present invention.

FIG. 1 is a configuration diagram of an SOI-based path generating apparatus according to an exemplary embodiment of the present invention.

As shown in FIG. 1, the SOI-based path generating apparatus according to the exemplary embodiment of the present invention can be configured to include a storing unit 10, an input unit 20, a path setting unit 30, a display unit 40, and a path generating unit 50.

Each of the above-mentioned components will be described. First, the storing unit 10 stores at least one path SOI for each arbitrarily set section. That is, the storing unit 10 stores a path SOI indicating a path between a start point and an arrival point of each arbitrarily set section regardless of a distance, a time, or the like, and the number of path SOIs for each section is at least one.

The path SOI may or may not include information on a relationship with contents. The content can include a blog, a reply, a description, an event, an advertisement, and the like, having a form in which a text, an image, a moving picture, and the like, are provided, respectively, or are combined with each other.

Hereinafter, the meaning of the arbitrarily set section and the number of paths corresponding to the section will be described in detail.

For example, when it is assumed that arbitrary points are A, B, C, and D in a distance sequence, an arbitrary section can be configured of A (a start point) and B (an arrival point), be configured of B (a start point) and C (an arrival point), or be configured of A (a start point) and C (an arrival point). Here, the section configured of A (start point) and C (arrival point) includes B (path point); however, the path point does not have any special meaning.

As described above, each section is arbitrarily set without a special reference.

In addition, each section is divided using various kinds of themes and stored in the storing unit 10. Here, the theme can include a festival, a restaurant, a famous sight, foliage, a sunrise, or the like.

Meanwhile, when it is assumed that the section configured of A (the start point) and B (the arrival point) is a first section, the section configured of B (the start point) and C (the arrival point) is a second section, and the section configured of A (the start point) and C (the arrival point) is a third section, the number of path SOIs corresponding to each of the first to third sections is at least one. That is, at least one different path SOI is included for each section.

This path SOI can be generated and uploaded by a user, be generated and uploaded by an operator himself/herself, be generated and uploaded by an external professional agent, or be a computer-generated optimal path (e.g., optimal with respect to distance, travel time, fuel consumption, and the like).

Next, the input unit 20 receives an origination and a destination input from the user.

In addition, the input unit 20 receives a theme selected from the user and receives recommended paths (i.e., path SOIs) selected for each section corresponding to the selected theme.

That is, when the user selects a specific theme through the input unit 20, sections corresponding to the selected theme on a path from an origination to a destination are displayed on the display unit 40 by the path generating unit 50. At this time, the user can select his/her desired path among at least one of the recommended paths provided for each section.

Therefore, the user can select his/her desired paths for each section with respect to sections corresponding to the theme on the path from the origination to the destination.

In the case in which the input unit 20 is implemented in a touch screen, the input unit 20 and the display unit 40 can be implemented as a single module.

Next, the path setting unit 30 sets a main path from an origination to a destination input through the input unit 20 based on the path SOI stored in the storing unit 30. In this case, the path setting unit 30 can set the main path only using section information without considering the theme or can further include a path SOI storing unit having section information that is not associated with the theme to set the main path based on the section information that is not associated with the theme.

In addition, the path setting unit 30 can also set the main path from the origination to the destination using the known technology.

Next, the display unit 40 displays the main path set by the path setting unit 30 on a screen.

In addition, the display unit 40 displays a theme list on the screen to allow the user to select a specific theme.

Further, the display unit 40 displays sections corresponding to the specific theme on the main path when the user selects the specific theme, thereby allowing the user to select a specific section.

In addition, the display unit 40 displays at least one recommended path corresponding to the specific section when the user selects the specific section, thereby allowing the user to select his/her desired recommended path. Here, the recommended path, which is a result of performing a search from the storing unit 10 by the path generating unit 50, is transferred from the path generating unit 50.

This display unit 40 collectively displays the recommended path selected by the user with respect to the section selected by the user in the theme selected by the user, thereby allowing the user to recognize the recommended paths for each section in the theme selected by him/her at a time. That is, the display unit 40 displays a final path generated by the path generating unit 50 on the screen.

Meanwhile, the display unit 40 displays information processed in a multimedia system for a vehicle. For example, in a navigation mode, the display unit 40 displays a user interface (UI) or a graphic user interface (GUI) related to a map, a speed, a direction, a distance indication, or the like, associated with a current position, a destination, a path, or the like, in connection with driving. In a black box mode or a photographing mode, the display unit 40 displays a photographed image, a UI, or a GUI.

The display unit 40 can include at least one of a liquid crystal display (LCD), a thin film transistor-liquid crystal display (TFT LCD), an organic light-emitting diode (OLED), a flexible display, a three-dimensional display (3D display), a dual display displaying different images according to a viewing direction (for example, when a single display is viewed from a driver's seat, a map is viewed, and when it is viewed from a passenger seat, a broadcasting screen is viewed).

Some of these displays can be formed in a transparent type or a light transmitting type so that the outside can be viewed therethrough. This display can be called a transparent display, a typical example of which includes a transparent OLED (TOLED), or the like. A rear structure of the display unit 40 can also be a light transmitting structure.

In the case in which the display unit 40 and a sensor (hereinafter, referred to as a 'touch sensor') sensing a touch operation are formed in a mutual layer structure (hereinafter, referred to as a 'touch screen'), the display unit 40 can be used as an input device in addition to an output device. The touch sensor can have a form such as a touch film, a touch sheet, a touch pad, or the like.

The touch sensor can be configured to convert pressure applied to a specific portion of the display unit 40 or a change in capacitance, or the like, generated in the specific portion of the display unit 40 into an electrical input signal. The touch sensor can be configured to detect pressure at the time of being touched as well as a touched position and area.

Next, the path generating unit 50 searches at least one recommended path (a path SOI) corresponding to the section selected from the user from the storing unit 10 to transfer the searched recommended path to the display unit 40.

In addition, the path generating unit 50 generates the final path based on the recommended paths for each section corresponding to the theme selected from the user through the input unit 20, on the main path set by the path setting unit 30.

That is, the path generating unit 50 generating the final path based on a single recommended path for each section selected from the user among at least one recommended path matched to each section corresponding to the theme selected from the user.

In addition, the path generating unit 50 arbitrarily selects the recommended path with respect to the section that is not selected by the user. Here, in the case in which priority is assigned to each of the recommended paths, the recommended paths are selected based on the priority. In addition, in the case in which the number of recommended paths is one, a selection problem is not generated.

Although the exemplary embodiment of the present invention has described that the path setting unit 30 and the path generating unit 50 are separately implemented, the path setting unit 30 and the path generating unit 50 can also be implemented as a single module by a user's request/selection.

Figure 2:
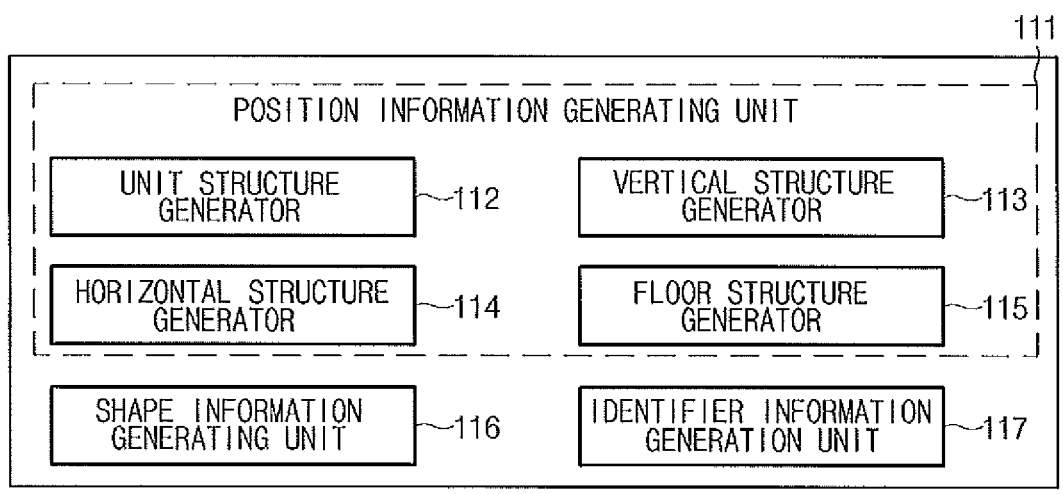
FIG. 2 is a configuration diagram of an SOI information generating apparatus according to an exemplary embodiment of the present invention.

FIG. 2 is a configuration diagram of an SOI information generating apparatus according to an exemplary embodiment of the present invention.

As shown in FIG. 2, the SOI information generating apparatus according to the exemplary embodiment of the present invention is configured to include a position information generating unit 111 generating position information, SOI structure information, SOI combination information, or the like, on a map, a shape information generating unit 116 generating shape information such as dot, line, region information, building information, or the like, on the position information, and an identifier information generating unit 117 generating and assigning identifier information for distinguishing each SOI from each other.

Here, the position information generating unit 111 generates the position information and generates and manages SOIs for the position information. In addition, the position information generating unit 111 manages relationship structure information in the case in which the SOIs are generated to have a relationship structure and manages combination information in the case in which the relationship structures of the SOIs are combined with each other.

The position information generating unit 111 includes a unit relationship structure generator 112 generating and managing one SOI, a vertical relationship structure generator 113 generating and managing a vertical relationship structure of SOIs so that a plurality of SOIs are included in one SOI, a horizontal relationship structure generator 114 generating and managing a horizontal relationship structure of SOIs so that a plurality of SOIs are connected in parallel with each other, and a floor structure generator 115 generating and managing a floor structure of SOIs so that a plurality of SOIs form a floor in one SOI.

The vertical relationship structure generator 113 generates the SOIs in a vertical relationship structure so that at least one other position information can be included in one position information so that at least one lower SOI is positioned in one SOI.

For example, the vertical relationship structure generator 113 can generate the SOI so that a building 1 and a building 2 are included in a region A. That is, the region A is generated as an upper SOI, and each of the building 1 and the building 2 is managed as an upper SOI and a lower SOI.

The horizontal relationship structure generator 114 generates the SOIs in a horizontal relationship structure so that the plurality of SOIs are horizontally positioned without a floor.

For example, the horizontal relationship structure generator 114 can generate the SOI so that a region B, a building 1, and a building 2 are horizontally connected to each other. That is, the region B, the building 1, and the building 2 are generated as the respective SOIs and are managed to be connected to each other.

The floor structure generator 115 generates and manages a plurality of SOIs so that a plurality of floors can be included in one region or a building, that is, so that the plurality of sub SOIs can form a floor of one building (i.e. one SOI).

For example, the floor structure generator 114 can generate the SOI so that the plurality of SOIs form the floor in one building. That is, one building is generated as an upper SOI, each floor is divided into an upper SOI and a lower SOI, and each SOI is separately managed.

The shape information generating unit 116 generates the shape information, which is a substantial image, such as dot, line, region information, building information, or the like, on the position information, and manages the shape information in an SOI unit. For example, the shape information generating unit 116 can image the region in the SOI unit, image a building in the region in the SOI unit, and image a configuration in the building in the SOI unit.

The identifier information generating unit 117 generates and manages the identifier information in the SOI generated according to each structure in the position information generating unit 111. The identifier information generating unit 117 can assign an SOI identifier sign according to one SOI when one SOI is generated, thereby allowing information to be managed in the SOI unit.

Figure 3:
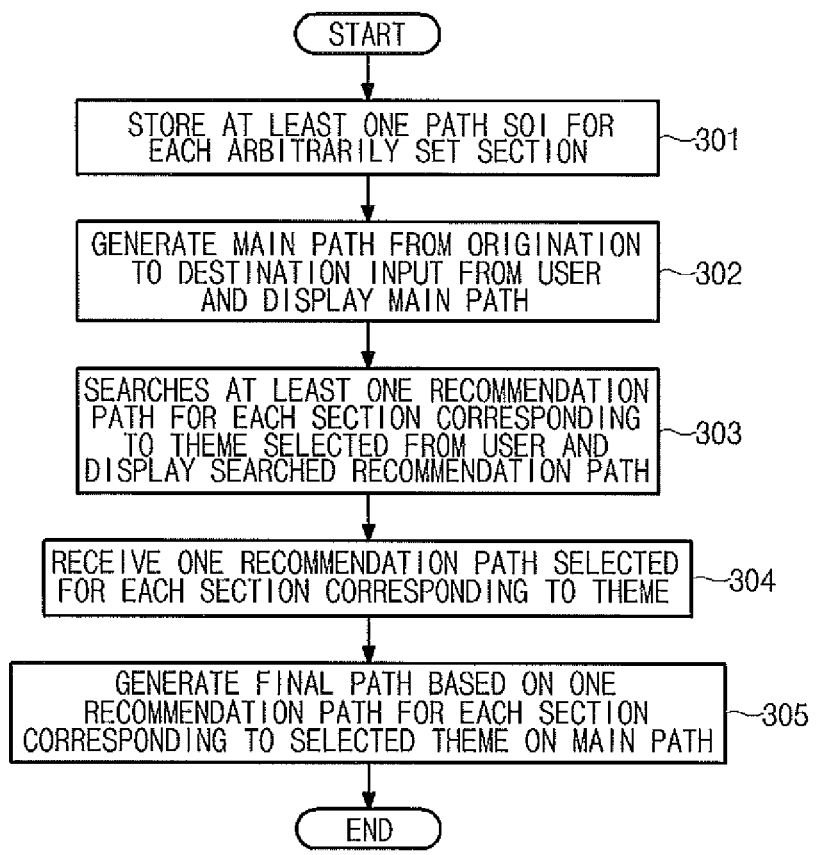
FIG. 3 is a flow chart of an SOI-based path generating method according to an exemplary embodiment of the present invention.

FIG. 3 is a flow chart of an SOI-based path generating method according to an exemplary embodiment of the present invention.

First, the storing unit 10 stores at least one path SOI for each arbitrarily set section (301).

Then, the path setting unit 30 generates a main path from an origination to a destination input from a user through the input unit 20 and then displays the main path through the display unit 20 (302).

Thereafter, the path generating unit 50 searches at least one recommended path for each section corresponding to a theme selected from the user through the input unit 20 from the storing unit 10 and then displays the searched recommended path through the display unit 20 (303).

Next, the input unit 20 receives one recommended path selected for each section corresponding to the theme (304).

Then, the path generating unit 50 generates a final path based on one recommended path for each section corresponding to the theme selected through the input unit 20, on the main path set in the path setting unit 30 (305).

Referring now to FIG. 4, the embodiments of the invention are further illustrated through an example. A user wishes to travel from origination point A to destination point E. A system (e.g., a computer) generates a main path (depicted in solid lines in FIG. 4A). The main path passes through points B, C, and D, which can divide the main path into a plurality of sections $S_1$, $S_2$, $S_3$, and $S_4$.

Figure 4A:
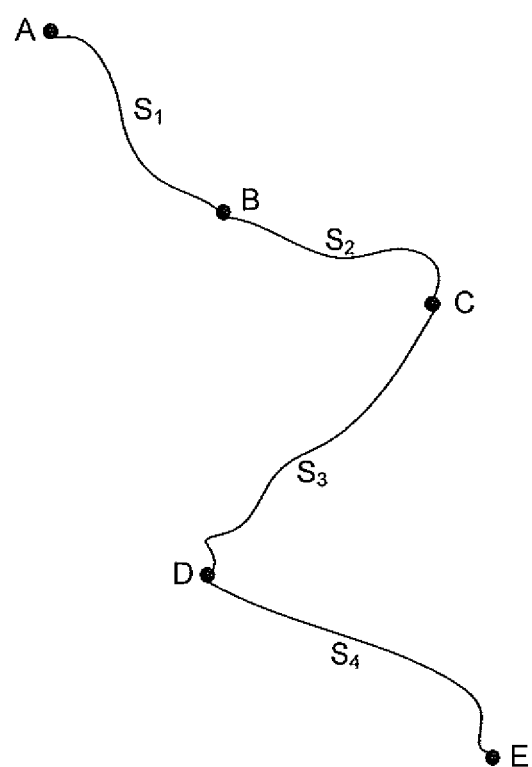
FIGS. 4A-4D depicts a sample user interface according to an exemplary embodiment of the present invention.
Figure 4B:
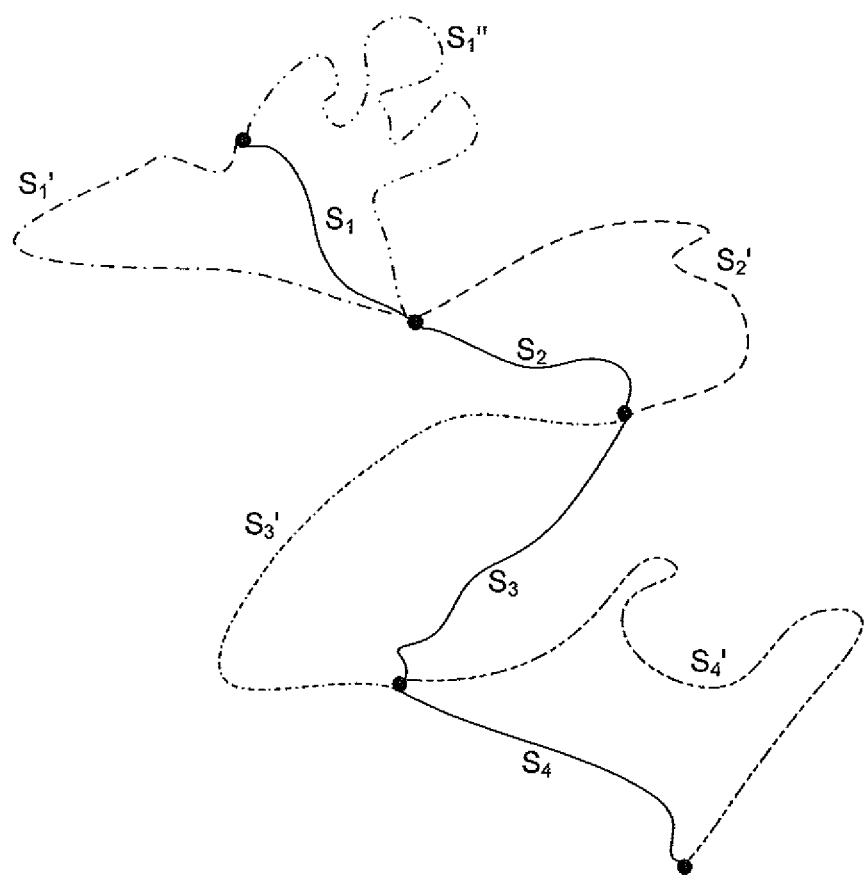

After the user selects a theme (e.g., foliage), the system searches a database of paths and proposes one or more paths that are associated with the selected theme. As shown in FIG. 4B, these alternative paths can be presented along with the main path so that the user can appreciate how the paths differ and select whether to follow an alternative path.

Figure 4C:
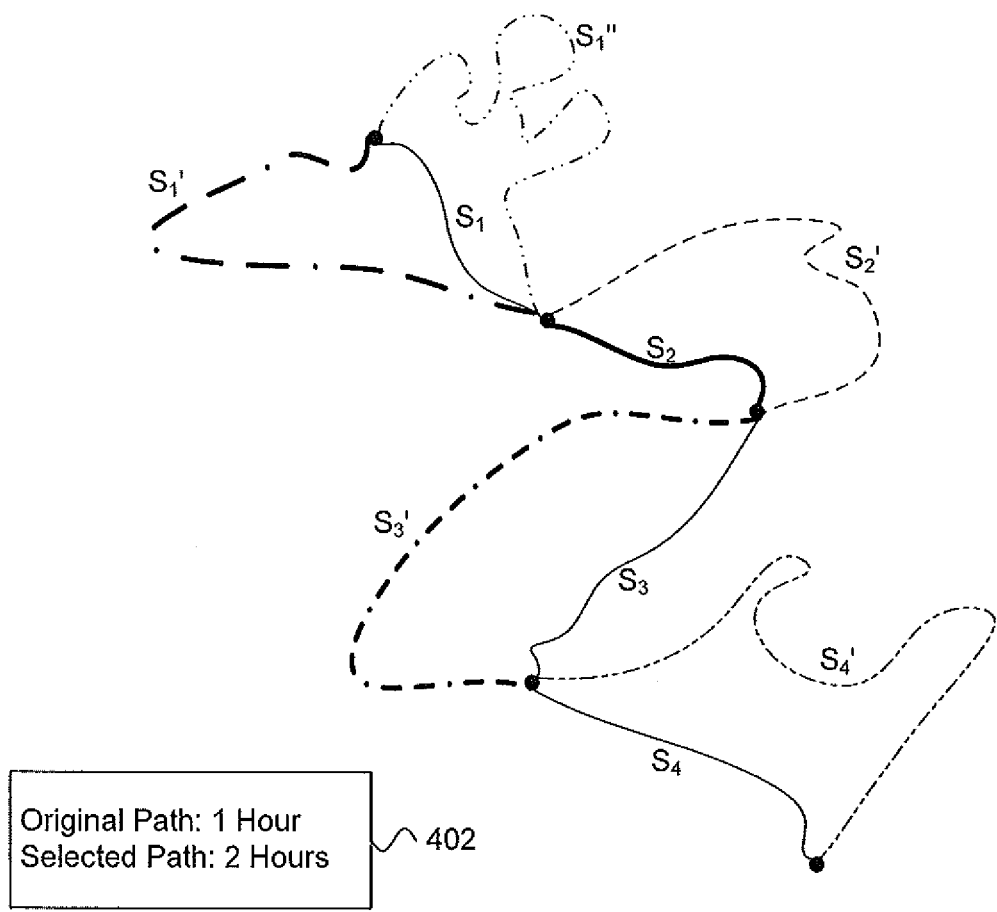

Referring now to FIG. 4C, a user can select one or more alternative path segments, for example, by clicking on the desired path segments. Selected path segments can be denoted, for example, by a change of color, a change of thickness (as depicted in FIG. 4C), highlighting, and the like. A graphical element 402 can provide a comparison between the duration of the main path and the selected alternative path, for example, in units of distance and/or time.

Figure 4D:
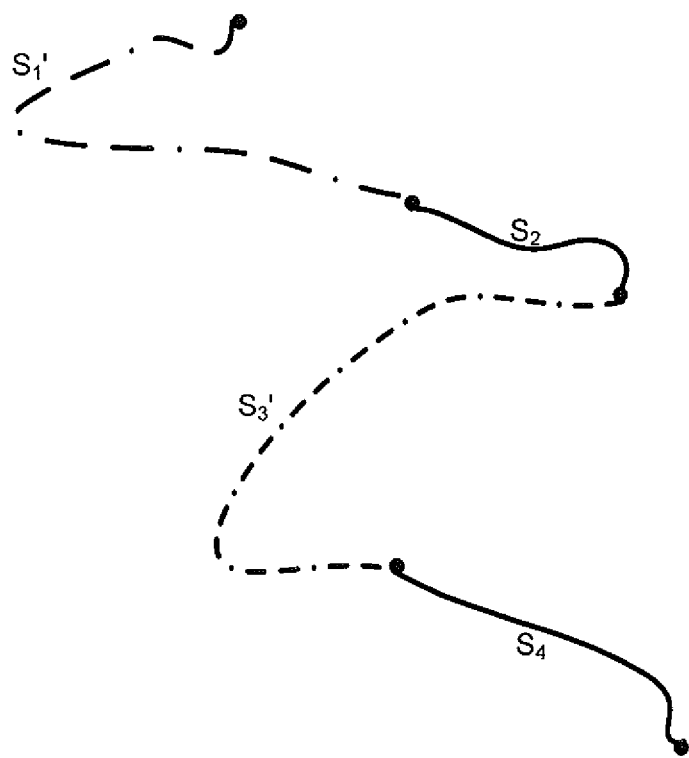

Referring now to FIG. 4D, once the user completes selection of an alternative path, the user submits the selection (e.g., by pressing a "SUBMIT" button or other graphical element). The system then generates a final path based on the selected paths. In some embodiments, the user need not affirmatively select a desired path for each path section. Rather, sections of the main path can be treated as default sections. For example, the user did not select either path segments $S_4$ or $S_4'$ in FIG. 4C. Accordingly, default path segment $S_4$ is utilized in the final path depicted in FIG. 4D.

Although each path section is referred to as a single SOI, it is noted that each section can be further divided into sub-SOIs. Likewise, a user can deviate from the set path at any point (including points along a path) and/or request a new path at any point.

Figure 5:
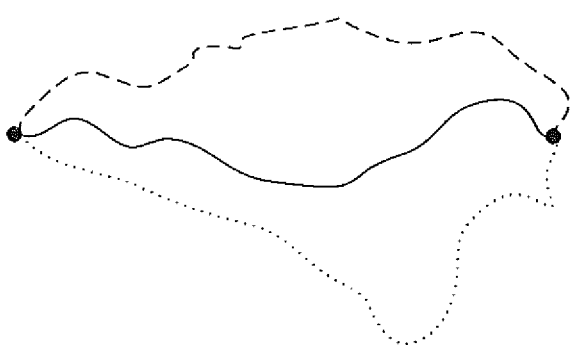
FIG. 5 depicts the presentation of one or more recommended path segments for a single path segment according to an exemplary embodiment of the present invention.

Referring now to FIG. 5, one or more recommended path segments can be presented for a single path segment, which can be one of many segments in a path.

Figure 6:
FIG. 6 depicts the extension of a recommend path segment to reach one or more path segments along the main path according to an exemplary embodiment of the present invention.

Referring now to FIG. 6, a recommended path segment (depicted as a dashed line) may not be coterminous with any segments along the main path. In such situations, the systems and methods described herein can add extensions to one or both ends of the recommended path segment (depicted as dotted lines) to connect the recommended path segment with other segments along the main path.

Through the above-mentioned process, it is possible to allow the user to select the path for each section in his/her desired theme. Advantageously, a user can select between one or more alternative paths, which can have special features that are not located at a discrete point, but instead are distributed along the path. Moreover, by presenting detours from a main path that eventually return to the main path, the user is provided with more useful information about the total delay associated with taking an alternative route.

As set forth above, according to the exemplary embodiments of the present invention, the main path corresponding to the origination and the destination input from the user is set and at least one recommended path for each section corresponding to a specific theme is provided in the case in which the user selects the specific theme, thereby making it possible to allow the user to select the paths for each section in his/her desired theme.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method for generating a path, comprising:
   storing, in a storing unit, at least one path for each arbitrarily set section among a plurality of sections;
   setting, in a path setting unit, a main path having the plurality of sections from an origin to a destination input from a user and then displaying the main path through a display unit;
   searching, in a path generating unit, for at least one recommended path for each of the plurality of sections corresponding to a theme selected by the user;
   recommending, in the path generating unit, at least one path that deviates from each of the plurality of sections in the main path and corresponds to the theme selected by the user;
   displaying, by the display unit, the at least one recommended path that deviates from each of the plurality of sections in the main path and corresponds to the theme selected by the user concurrently with the main path;
   receiving, in an input unit, a selection of one or more of the at least one recommended path for one or more of the plurality of sections; and
   generating, in the path generating unit, a final path based on the selection of the one or more of the at least one recommended path.

2. The method of claim 1, wherein in the step of generating of the final path, each of the sections of the main path is arbitrarily selected for inclusion in the final path where the at least one recommended path was not selected by the user for the corresponding section.

3. The method claim 1, further comprising displaying, in the display unit, the final path.

4. The method of claim 1, wherein in the setting of the main path step, the main path is set based on previously-stored paths.

5. The method of claim 1, wherein in the storing step, paths uploaded by other users are stored.

6. The method of claim 1, wherein the main path is initially set in the setting step as an optimal path from the origin to the destination.

7. The method of claim 6, wherein the optimal path minimizes one or more selected from the group consisting of: distance, travel time, and fuel consumption.

8. The method of claim 1, wherein a degree of deviation from the main path proposed in the setting step to the at least one recommended path for each of the sections is displayed.

9. The method of claim 8, wherein the degree of deviation is expressed in terms of one or more selected from the group consisting of: distance, travel time, and fuel consumption.

10. The method of claim 8, wherein the at least one recommended path is extended to connect with one or more other sections.

11. An apparatus for generating path, the apparatus comprising:
    a storing unit configured for storing at least one path SOI for each arbitrarily set section among a plurality of sections;
    an input unit configured for receiving an origin and a destination input from a user, receiving a theme selected by the user, and receiving a selection of one or more of at least one recommended path for one or more of the plurality of sections corresponding to the selected theme from the user;
    a path setting unit configured for setting a main path having the plurality of sections from the origin to the destination input through the input unit;
    a display unit configured for displaying the main path set by the path setting unit, a theme list, each of the sections corresponding to the selected theme, and the at least one recommended path that deviates from each of the plurality of section in the main path and correspond to the theme selected by the user concurrently with the main path; and
    a path generating unit configured for searching for the at least one recommended path in the plurality of sections corresponding to the selected theme from the storing unit to transfer the at least one recommended path to the display unit, recommending at least one path that deviates from each of the plurality of sections in the main path and corresponds to the theme selected by the user, and generating a final path based on the selection of the one or more of the at least recommended path corresponding to the theme selected through the input unit.

12. The apparatus of claim 11, wherein the path generating unit arbitrarily selects each of the sections of the main path for inclusion in the final path where the at least one recommend path was not selected by the user for the corresponding section.

13. The apparatus of claim 11, wherein the display unit further performs a function of displaying the final path generated by the path generating unit.

14. The apparatus of claim 11, wherein the path setting unit sets the main path based on paths previously-stored in the storing unit.

15. The apparatus of claim 11, wherein the storing unit stores paths uploaded by other users.

16. The apparatus of claim 11, wherein the path setting unit is further configured to initially set the main path as an optimal path from the origin to the destination.

17. The apparatus of claim 16, wherein the optimal path minimizes one or more selected from the group consisting of: distance, travel time, and fuel consumption.

18. The apparatus of claim 11, wherein the display unit is further configured to display a degree of deviation from the main path to the at least one recommended path for each of the sections.

* * * * *